United States Patent

[11] 3,632,882

[72] Inventors Walter V. Ciecierski
Ridgefield;
Welles K. Reymond, Noroton Heights, both of Conn.; Frederick R. Cronin, Larchmont, N.Y.

[21] Appl. No. 40,008
[22] Filed May 15, 1970
[45] Patented Jan. 4, 1972

[73] Assignee General Datacomm Industries
Norwalk, Conn.

[54] SYNCHRONOUS PROGRAMABLE MIXED FORMAT TIME DIVISION MULTIPLEXER
4 Claims, 5 Drawing Figs.

[52] U.S. Cl. .......... 179/15 BA
[51] Int. Cl. .......... H04j 3/16
[50] Field of Search .......... 179/15 BA, 15 BY, 15 BV, 15 BS, 15 BW

[56] References Cited

UNITED STATES PATENTS

| | | | |
|---|---|---|---|
| 3,306,979 | 2/1967 | Ingram | 179/15 BA |
| 3,437,755 | 4/1969 | Brown | 179/15 X BW |
| 3,534,264 | 10/1970 | Blasbalg | 179/15 X BV |
| 3,541,524 | 11/1970 | Blasbalg | 179/15 X BV |

*Primary Examiner*—Ralph D. Blakeslee
*Attorney*—Pennie, Edmonds, Morton, Taylor and Adams

ABSTRACT: A synchronous time division multiplexer and demultiplexer are provided which permit the transmission of data from a plurality of sources in a mixed format frame with means for programing the duration of any time slot in a frame, including the sync slot, to accommodate one to N bits.

INVENTORS
WALTER V. CIECIERSKI
WELLES K. REYMOND
FREDERICK R. CRONIN
BY Pennie, Edmonds, Morton, Taylor and Adams
ATTORNEYS INVENTORS
WALTER V. CIECIERSKI
WELLES K. REYMOND
FREDERICK R. CRONIN
BY Pennie, Edmonds, Morton, Taylor and Adams
ATTORNEYS INVENTORS
WALTER V. CIECIERSKI
WELLES K. REYMOND
FREDERICK R. CRONIN
BY Pennie, Edmonds, Morton, Taylor and Adams
ATTORNEYS

SYNCHRONOUS PROGRAMABLE MIXED FORMAT TIME DIVISION MULTIPLEXER

BACKGROUND OF THE INVENTION

The present invention relates to multiplex communication and more particularly to time division pulse multiplexing systems in which intermittent pulse signals from a plurality of unsynchronized transmitters are multiplexed over a common transmission facility. Pulse signals of relatively low pulse repetition frequency from various sources are interleaved with one another to form a composite data stream that is transmitted at high speed for some distance over a common link to a time shared computer for example.

With character interleaved systems of the prior art, it has been common practice to make the number of bits per time slot equal the number of data bits per character of the channels being multiplexed. It has also been customary practice to make all time slots in a frame of the same duration, with each slot being equal to or greater than the number of data bits per character of the channel having the greatest number of data bits per character. When data sources having different character lengths are multiplexed, the operation is inefficient due to the fact that there have been more bits assigned to the composite data frame than are necessary to convey the data.

In accordance with the present invention, an efficient synchronous multiplexer system is provided having programable timing generators at the transmitter and receiver which transmit and receive any desired sequence of variable duration time slots in a frame, each having a predetermined duration of one to N bits that can readily and efficiently accommodate a plurality of different data sources having both mixed rates and mixed character lengths.

Figure 1:
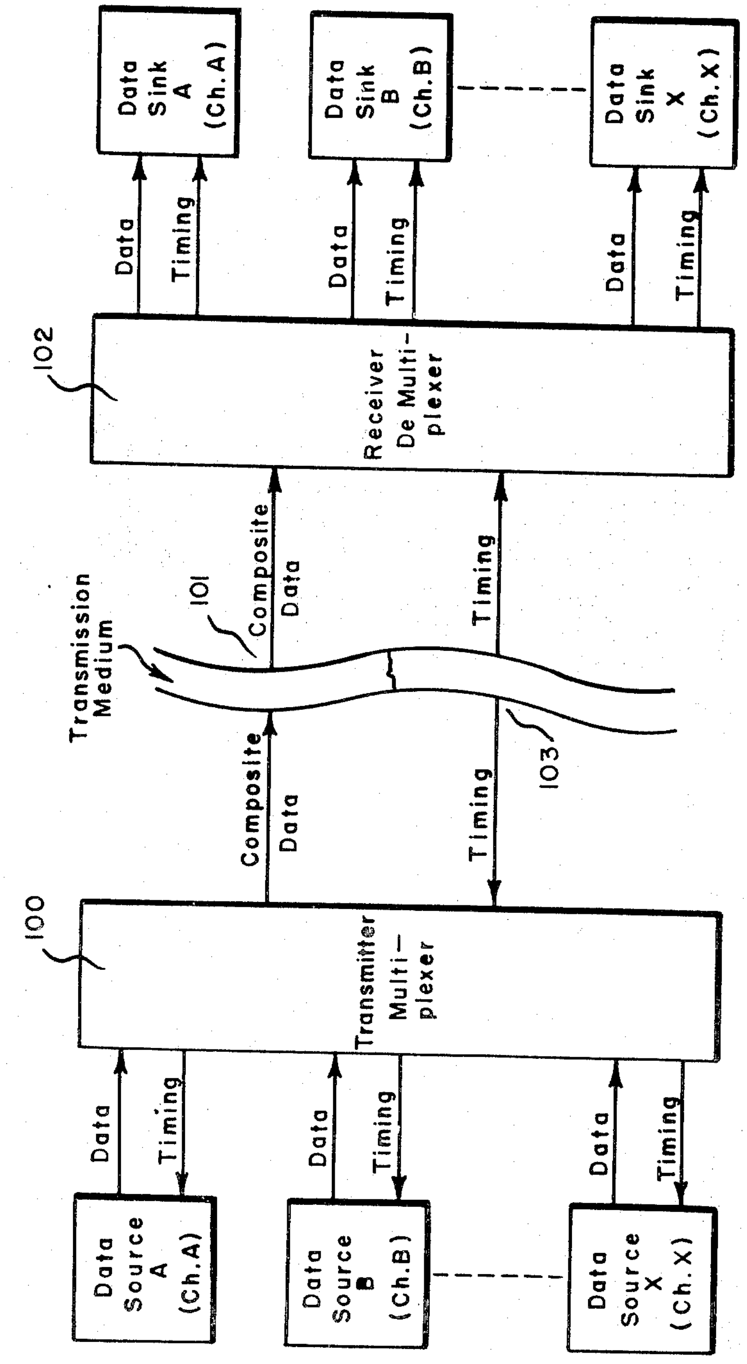
FIG. 1 shows a simplified block diagram of a time division multiplexer in which the present invention finds efficient application.
Figure 2:
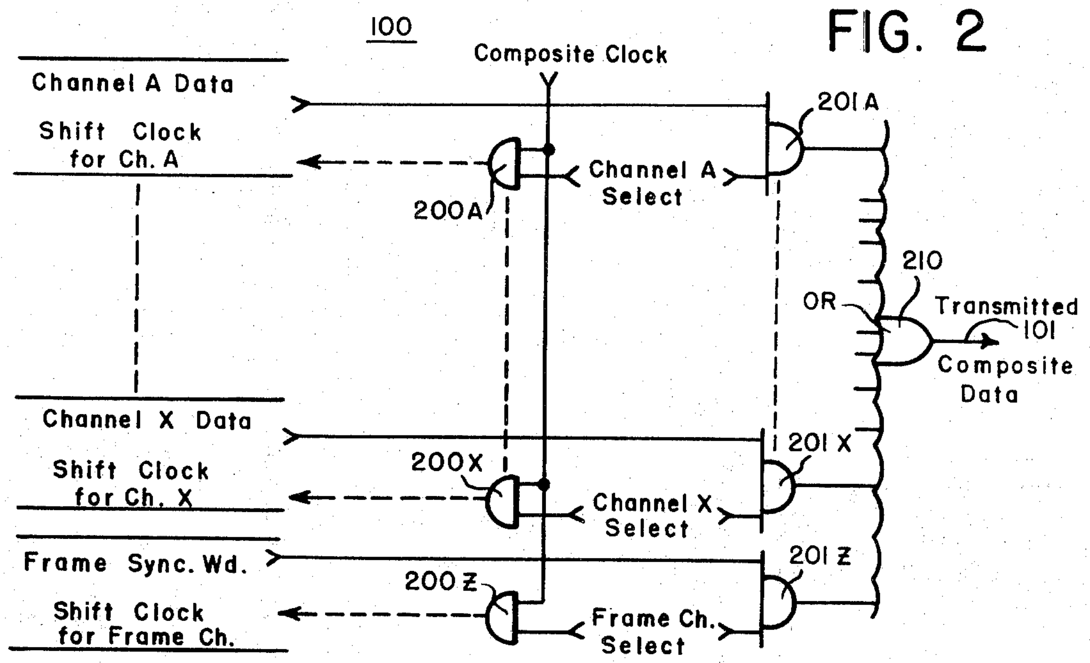
FIG. 2 is a simplified functional block diagram of the transmitting multiplexer.

The block diagram of FIG. 1 illustrates a data transmission system having a plurality of asynchronous pulse data sources (channels A–X) that are time-division multiplexed by transmitter multiplexer 100 as a bit or character interleaved composite data stream via a conventional transmission facility 101 to a receiving demultiplexer 102. For purpose of simplification, composite interface equipment (high-speed modems, etc.) is not shown. Receiving demultiplexer 102 operates synchronously with the transmitting multiplexer 100 to separate and deliver the interleaved data signals (bits or characters) to the appropriate data sinks A–X as shown. A composite clock or timing signal for the transmitter multiplexer 100 and receiver demultiplexer 102 is provided by high-speed interface modems (not shown) on line 103.

The digital data originating at sources A–X is typically that generated by teletype machines and various peripheral computer devices. Accordingly, the pulse repetition rate and the bits per character may differ from one source to the next. The data from each source is thus advantageously stored in an asynchronous buffer storage register, preferably of the type described in the inventors' copending application Ser. No. entitled "Asynchronous, Start-Stop, Data Buffer." Data stored in each channel register is sequentially shifted out by a separate channel shift clock signal that is produced for each channel A–Z. A composite clock signal is supplied as one input to each AND-circuit 200A–200Z. An appropriate channel select signal (generated by the timing generator shown in FIG. 4) is supplied to the other input of AND-circuits 200A–200X. Each channel shift clock signal comprises a burst of composite clock signal timed in coincidence with the particular channel select signal. In similar fashion, the frame sync signal is transferred from its generating register by a shift clock signal produced with the coincident application of composite clock and frame channel select signals to the inputs of AND-gate 200S.

The respective data and frame sync signals are supplied in sequence to OR-circuit 210 via AND-gates 201A–201Z. The data from each channel is presented at the time its channel select signal is produced and is OR'ed together to provide the composite data and frame sync to transmission facility 101.

Figure 3:
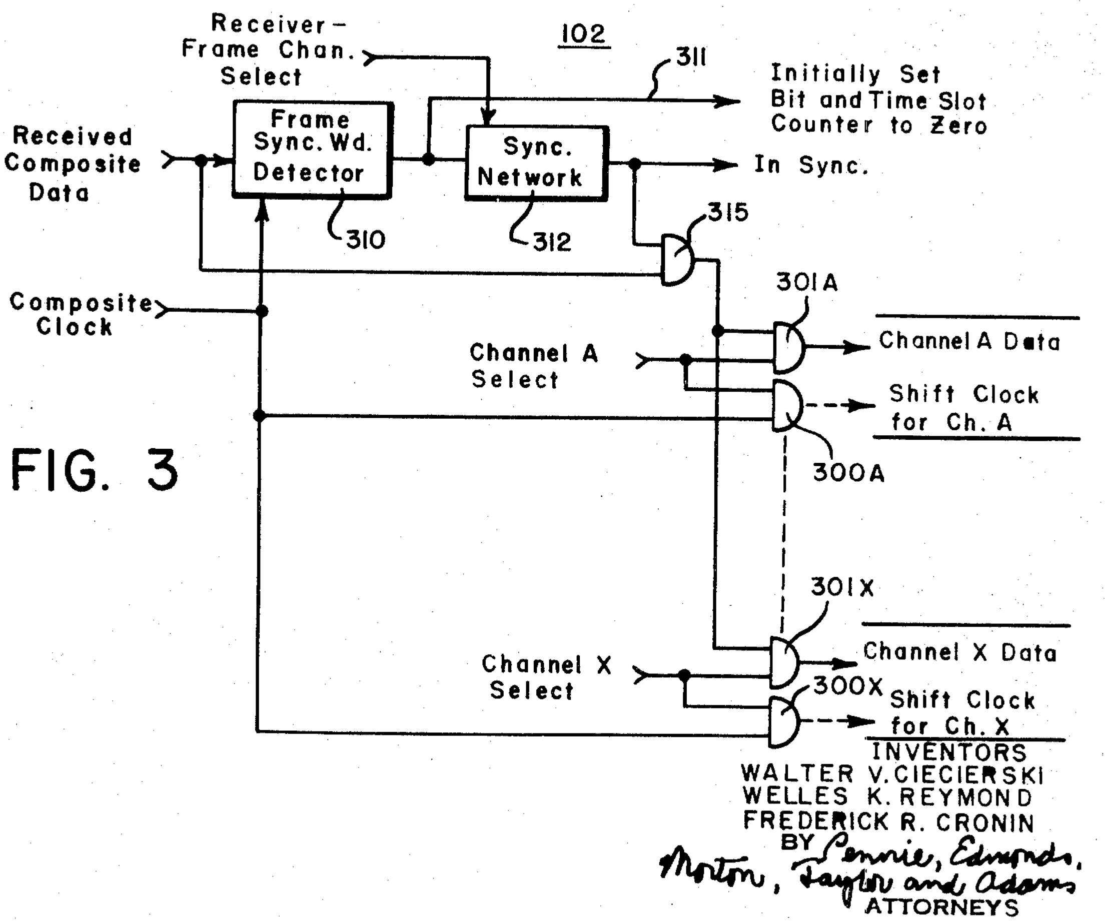
FIG. 3 is a simplified functional block diagram illustrating the operation of the receiving multiplexer.

The composite transmitted data stream is received by a companion demultiplexer 102 shown in the functional block diagram of FIG. 3. Composite clock signal is supplied to the receiver from the high-speed receiving modem and channel select signals (channel A–X and frame sync) are supplied from the receiver timing generator. A frame sync word detector 310 continuously examines the composite data stream for the frame sync word which has a predetermined identifiable format such as, for example, the well-known seven bit binary sequence described by Barker. Detector 310 may thus comprise a shift register which generates an initial frame identifying signal that is delivered to the receiver timing generator via 311 and functions to set the bit and time slot counters for that unit to zero. Sync network 312 is supplied with both the output sync signal from 310 and a frame channel select signal from the receiver timing generator, the latter functioning as a gate control. Such sync networks function to assure accurate acquisition and retention of correct receiver frame synchronization and are well known in the multiplex art. An in sync output signal from 312 is supplied as one input to AND-gate 315 the other input being the received composite data signal. Thus when the receiver timing generator is locked in sync with the received frame synchronization signals, composite data is supplied in parallel to one input of each channel AND-gate 301A–301X and the channel data in each time slot of a frame is directed to its appropriate data sink or output buffer under control of the corresponding channel select signals (A–X) supplied as second inputs to 301A–301X from the receiver timing generator. At the same time, shift clock signals for each channel buffer are provided by AND-gates 300A–300X, the inputs of which are supplied with both the respective channel select signals and composite clock signal.

Figures 4, 4A:
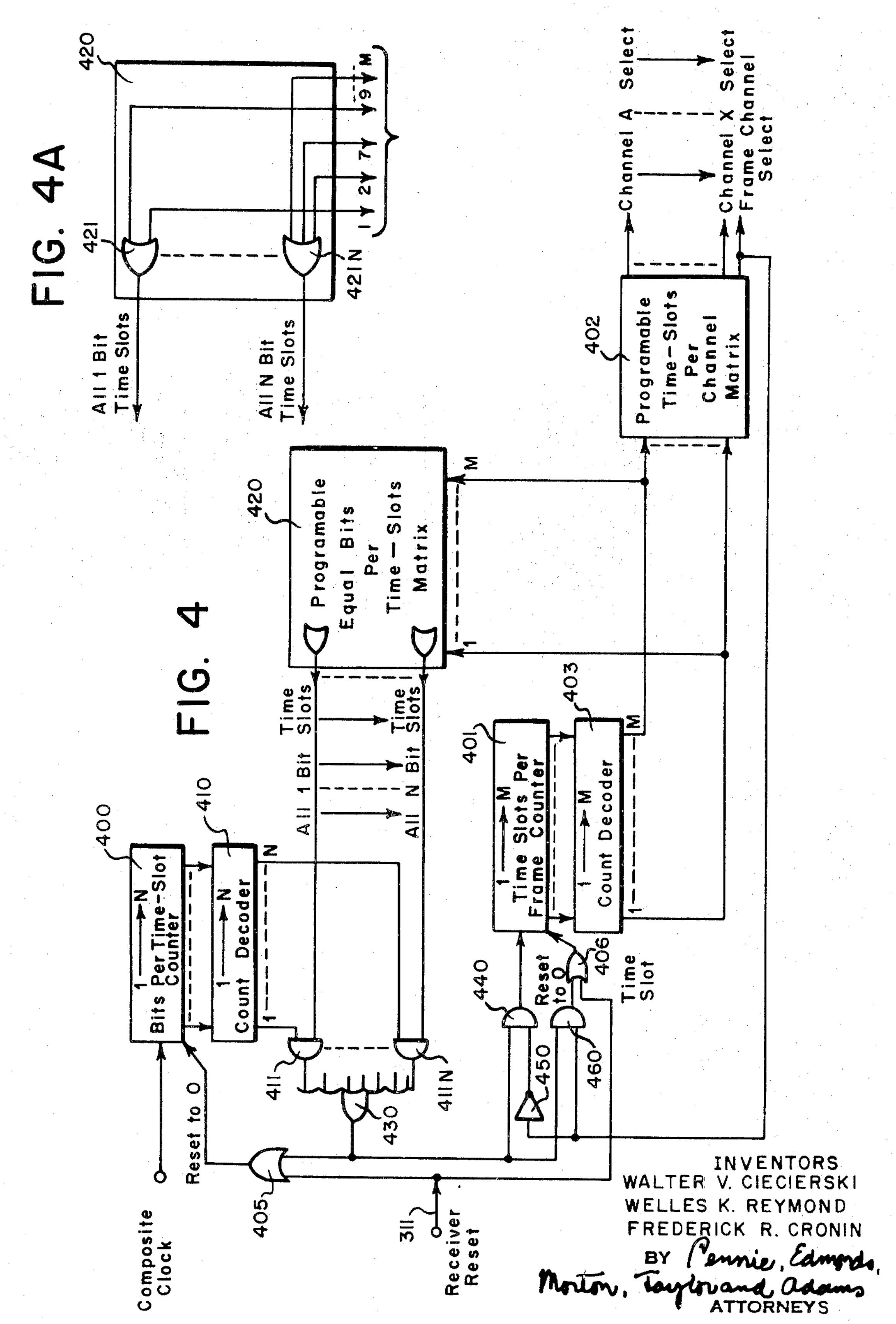
FIG. 4 is a simplified functional block diagram of the programable mixed format timing generator which produces the sync and channel time slot control signals for each frame of interleaved signals.
FIG. 4A is functional block diagram of a programable time slot matrix used in the timing generator of FIG. 4.

The programable mixed format feature of the present invention is controlled and made possible by the transmitter and receiver timing generators, a preferred embodiment of which is shown in FIG. 4. Both timing generators are identical except for initializing conditions. Whereas the transmitter timing generator is initially set to transmit the frame sync word first, the receiver timing generator has its bit and time-slot counters set to zero on the initial detection of the frame sync word. The multiplexer and demultiplexer timing generators include three major timing determinants which function cooperatively to produce the desired programable, mixed format, time division multiplexing operation. These determinants are a bits-per-time-slot counter 400, a time slots per frame counter 401 and a time-slot per channel matrix 402. Counter 400 is a 1 through N counter which is capable of counting up to the maximum number of bits that will ever be assigned to any given time slot in the system. Incoming composite clock cycles are counted until the counter receives a reset signal from OR-gate 405 whereupon it starts counting anew to sequentially measure the number of bits in each successive time slot in the programmed frame.

The outputs of counter 400 are supplied to a companion 1 through N decoder 410 whose separate output counts 1–N are each supplied to a first input of AND-gates 411–411N. The second input to each of these gates is supplied by an appropriate output signal from a programable equal bits per time slot matrix 420. Matrix 420 comprises a series of OR-gates 421–421N the outputs of which are connected to AND-gates 411–411N and the inputs of which are connected to one or more outputs of the time slot count decoder 403. If, for example, each of the time slots 1–M were to be programmed to have an equal number of N bits, the output OR-gate 421N would be connected to 411N as shown and the time slot outputs 1–M would all be connected to the input of 421N. By way of further example, if slots 2, 7 and M are to have N bits and slots 1 and 9 each are to have 1 bit, the matrix would be connected as shown in FIG. 4A. The coincidence of two input signals to any one of the AND-gates 411–411N produces an output to multiple input OR-gate 430 the output of which resets counter 400 and at the same time is supplied to counter 401 via AND-gate 440. The second input to 440 is maintained in the on condition by inverter 450 except during the generation of a frame sync channel. In the latter case, the frame channel signal functions together with the reset signal for counter 400 to operate AND-gate 460 and reset the time slots per frame counter 401 to zero. Thus in the multiplexer operation, the frame sync channel is the last time slot in the system. The time slots per channel matrix 402 comprises a number of OR gates corresponding to the number of channels, including the frame channel. The number of inputs to each channel assigned gate determines the number of time slots in each frame that are assigned to each channel.

Operation of the timing generator as described above is the same for the demultiplexer except that counters 400 and 401 are initially set to zero by a reset signal from sync detector 310 (see FIG. 3) supplied to OR-gates 405 and 406 via lead 311.

In operation, the matrices 402 and 420 are programmed identically for the synchronous multiplexer and demultiplexer to most efficiently accommodate the specific sources supplying data to the system.

While preferred embodiments of the invention have been described, it will be apparent to those skilled in the art that various changes may be made within the scope of the invention as defined in the claims.

We claim:

1. A synchronous time-division multiplexer timing generator programable to generate 1 to M time slot gate signals per frame, each of said gate signals being individually programable in time duration to accommodate 1 to N bits, said generator including:

a. a recycling bits-per-time slot counter adapted to receive composite clock pulses and provide separately selectable time-slot count signals of 1 to N bits;

b. a recycling time-slots per frame counter adapted to receive time-slot count signals and provide separate frame time slot count signals of 1 to M time slots per frame; and c. gate means selectively operable by any of said 1 to M frame time-slot count signals to supply selected time slot count signals to the input of said time-slots per frame counter.

2. Apparatus in accordance with claim 1 wherein circuit means responsive to a received frame sync signal are provided to reset to zero both the said bits-per-time-slot counter and the time-slots per frame counter.

3. Apparatus in accordance with claim 1 wherein programable circuit means are provided to interconnect any of said 1 to M frame time slot signals to one or more data channel select terminals.

4. Apparatus in accordance with claim 1 wherein programable circuit means are provided to interconnect any of said 1 to M frame time slot count signals to any of said gate means.

* * * * *